April 15, 1930.   W. B. WESCOTT   1,754,535
PURIFYING AND CONCENTRATING LATEX
Filed Dec. 28, 1927
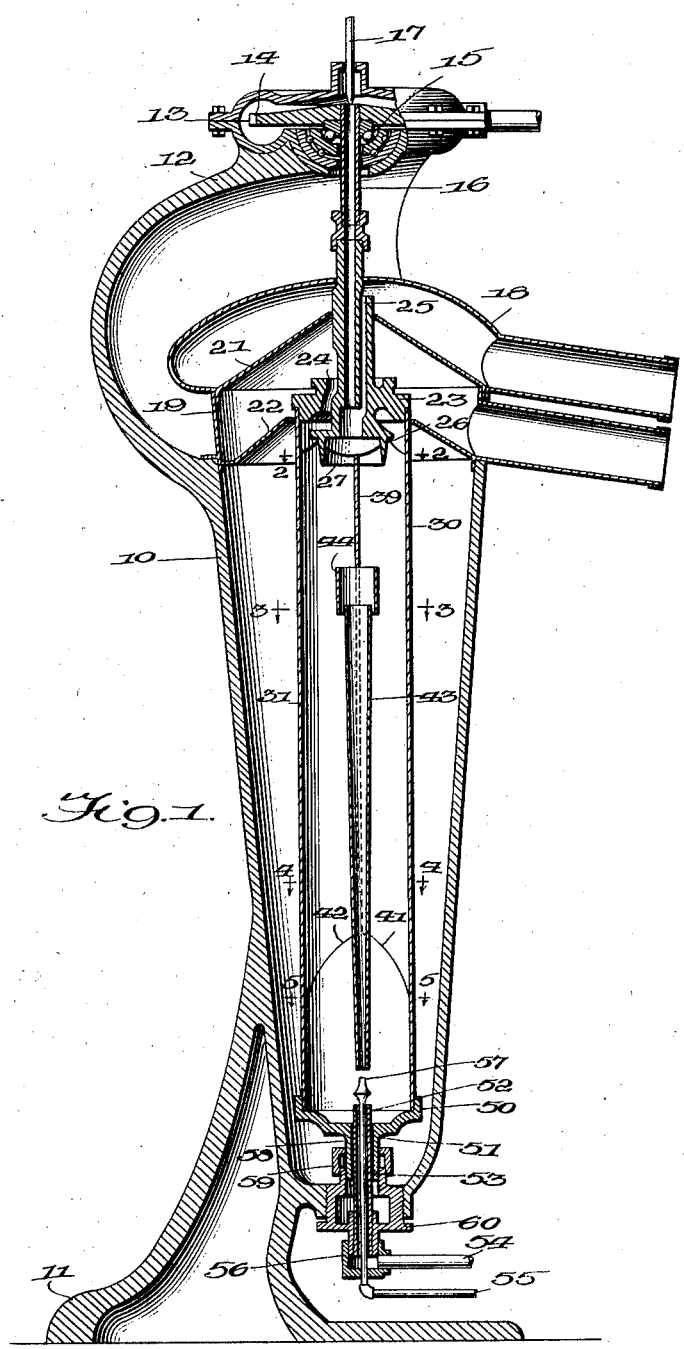
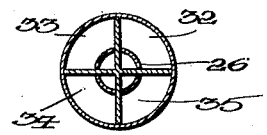
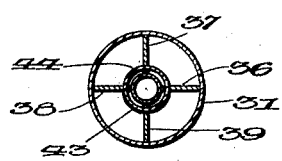
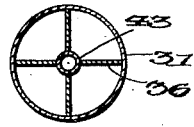
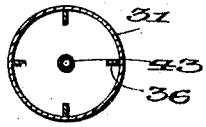
Inventor
W. B. WESCOTT,
By K. P. McElroy
Attorney

Patented Apr. 15, 1930

1,754,535

UNITED STATES PATENT OFFICE

WILLIAM B. WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

PURIFYING AND CONCENTRATING LATEX

Application filed December 28, 1927. Serial No. 243,166.

This invention relates to purifying and concentrating latex; and it comprises certain improvements in the process described and claimed in my prior application, Serial No. 601,909, filed November 18, 1922, on centrifugal purification and concentration of latex, wherein the latex to be treated is first freed of finely divided coagula (cream), all particles coarser than, say, 4 or 5 mu in average diameter being removed by a special preliminary centrifugal treatment or otherwise, is then treated with a reagent accelerating centrifugal separation, such as dissolved carragheen and the treated latex is then concentrated by centrifuging, following the process set forth in my prior application and, while still under the influence of an intense centrifugal force, the residual aqueous fluid in the concentrate is modified or replaced by an alkaline solution of a protective colloid, without substantial dilution of said concentrate, whereby the concentrate is stabilized and the accelerating reagent is removed or its effects annulled; and it also comprises as a new composition of matter a purified, stable and concentrated artificial latex substantially free of the non-rubber solubles of natural latex and of particles of more than about 4 or 5 mu in average diameter, said latex being capable of uniform dilution and, when diluted to the approximate consistency of commercial latex, being wholly capable of being taken up by capillaries and pores of ordinary size, such as those of paper, or the fiber interstices of textiles; all as more fully hereinafter set forth and as claimed.

In my prior application, Serial No. 601,909, filed November 18, 1922, and in my Patent No. 1,630,411, granted May 31, 1927, I have described and claimed a process of producing purified and standardized latex which may be freed of non-rubber solubles, wherein ordinary commercial latex is supplied to a particular type of continuous centrifugal machine (such as that shown in Patent No. 1,630,412, granted May 31, 1927) in such a way as to avoid violent agitation while bringing it to the speed of the centrifugal, and is therein separated into a more concentrated latex and a serum substantially free of rubber. Ordinarily, residual serum in the concentrate is finally displaced and an artificial serum substituted by introducing water containing ammonia or other alkaline protective agent. The purified and protected latex is finally discharged under similar precaution against undue agitation while its speed lessens and, if desired, under such conditions as to cause further concentration by desiccation; being collected either as a concentrated liquid or being dried to a solid as it emerges from the machine.

The processes described and claimed are efficient. But time is a factor in the concentration of latex and, if insufficient time is afforded for complete separation, some or much of the finer latex particles remain in the heavy serum fraction and are lost to the concentrate; furthermore the careful work requisite in concentrating latex without producing partial coagulation renders the operation slow and the capacity of a given machine is not as great as could be desired; the feed of latex through the machine is comparatively slow. And the quality of the products formed in some measure depends on the quality of the original latex used. No coagulation takes place in the machine, but any particles of coagula present in the original latex persist in the product.

It is the purpose of the present invention in dealing with latices by a similar process to increase the capacity of the apparatus by rendering quicker operation possible and to effect certain preliminary purifying treatments on the latex to be modified, with the object of producing a final standardized, concentrated, purified and stable artificial dispersion of rubber analogous to latex which is of uniform quality, as regards particle size and content of non-rubber solubles, whatever the character of the latex treated; the final product being one free of coarse suspended matter and therefore susceptible, when diluted, of being taken up completely by capillaries. It need contain no suspended particles coarser than about 4 or 5 mu. The present process is also applicable to artificial dispersions of rubber analogous to latex.

These dispersions usually contain considerable coarse matter.

Coagulation of latex is a process which goes on progressively; slowly or quickly, as the case may be. In the production of commercial ammonia-preserved latex, there is usually some slight amount of coagulation which has taken place before the ammonia is added. Coagula flocks or flocculæ are always found in commercial latex. Ammonia seems to arrest the coagulative actions and it does not seem probable that there is any substantial development of coagulation after addition of ammonia, with ordinary care in storage, shipping and handling. As stated, however, in commercial latex, there is a small amount of what is commonly called "cream", which represents finely divided coagula. The coagula particles although not of any great absolute size, for the most part, are of a considerably larger order of magnitude than that of the natural dispersed single globules of rubber in normal latex; and, while they can be stirred into water or latex, they do not form a permanent dispersion. They rise as a cream on standing. This cream, if separated from the latex, will temporarily disperse in water but will again rapidly separate. The ordinary commercial test for its presence and for its amount is to dilute 1 cc. of latex with 99 cc. of water and read the volume of the cream which rises as a supernatant layer in a few hours. In good quality latex, the amount of this coarse matter may be negligible for most purposes, but in some grades there may be 5 to 10 per cent of the total rubber present as this cream. The particles present in the cream are of various sizes; but they are all relatively coarse. Normal latex particles, such as those contained in the fine-grained suspension from which the cream separates, do not much exceed 4 or 5 mu and are probably never larger than 6 mu. Sometimes in ammonia-preserved latex free from coagula particles there is, in time, a slow separation of the coarser of these natural particles. This phenomenon which may be called a secondary separation is not readily observable in latex of normal concentration and differs from the quicker separation of the minute coagula constituting the "cream" of commercial latex. On standing the latter rises to form a sharply defined "cream" layer in a few hours, while the secondary separation, in greatly diluted latex, appears only after several days as faintly visible zones or layers which, in the course of several weeks, may finally form a single supernatant layer resembling, in its outward appearance, the rapidly formed "cream" layer of coagula. This slowly formed secondary separation, however, is found to consist, in major part, of the larger normal individual particles and the average size of the particles is found to decrease from the top of the layer to the bottom. The term "cream" is herein used to denote the rapidly appearing supernatant layer of coagula or of indivisible latex particles of a considerably larger order of magnitude than the largest of the normal latex particles. The presence of some "cream" is immaterial for many uses of latex, but where permeation of pores is wanted, "cream" is quite objectionable. When commercial latex is used for taking rubber into capillaries, this coarser material is filtered out and remains on the exterior. In some cases, it operates to lessen further the amount of ingoing rubber, since it tends to plug the pores progressively and then act as a sort of filter. In the "pigmentation" of latex particles with colloidal substances, as in the preparation of latex for electrodeposition, the presence of these coarse particles is undesirable, particularly if the pigmented particles are to be deposited in the capillary interstices of textiles.

In the present invention, the latex to be concentrated, etc. is preliminarily treated to remove the coarse cream material, by my prior process modified to the extent that the centrifugal action is limited to that just requisite to concentrate the cream without material concentration of normal latex particles and that the normal latex is displaced in, and removed from, the cream concentrate and the latter washed, usually, with a solution adapted to accelerate the later centrifugal concentration of the cream-free fraction. Addition of the accelerating reagent at this time is a convenient way of securing a thorough mixture of the reagent and the latex, and at the same time of freeing the cream of most of the entrained particles of normal size. By preliminarily separating cream, the final concentrated and standardized latex produced by following my prior process will be free of coarse material and its component particles will all enter capillaries. For many purposes, this power of 100 per cent penetration is commercially very important. The preliminary purification may be effected by simply running the latex through the same type of machine but with a sufficiently rapid flow to separate merely the stated cream; the heavy liquid efflux being normal latex. However, I prefer also to wash the cream in order to remove substantially all of the normal globules and return them in the latex for later concentration. When it is desired to obtain the cream as a stabilized semi-fluid concentrate protected against further coagulation and capable of being let down with water, I admix a suitable protective colloid with the cream, sometimes doing this with the wash solution, but preferably doing it after washing, particularly when the wash water contains the preferred accelerating agent, and, in the latter case, in such amount as will replace substantially all the residual wash solution.

Another feature of my invention is accelerating the concentration of the latex in the machine. There are many ways in which the latex can be treated to accelerate separation in the machine into serum and concentrated latex without producing coagulation. One is to adjust the hydrogen ion concentration of the latex, in the presence of a protective colloid, to a pH value between pH 7.0 and 5.5. Hemoglobin may be used as the protective colloid. Separation of the latex between these pH values is effected in the centrifugal with more rapidity than in the presence of alkali, such as ammonia. Adjustment of the hydrogen ion concentration, to accelerate concentration without producing any coarse material or coagula, requires, however, a somewhat delicate control and usually the addition of a buffer as well as of a protective colloid. There are many possible materials whose addition, under controlled conditions, will accelerate separation enough to give a substantial betterment in capacity; but most of them are somewhat difficult of control and have the further disadvantage of leaving undesirable foreign matter in the latex concentrate which is not readily removed. The low upper limit of centrifugal concentration, at higher hydrogen ion concentrations than pH 7.0 is also a disadvantage.

To so produce a stable concentrate, of which the individual particles are redispersible in water, the material used to accelerate separation must usually be removed after separation or its effect neutralized but, although this may be accomplished by the washing step of my prior process, it is often a matter of some difficulty. Furthermore, it is very wasteful of protective colloid, as the protective, for the most part, is lost in the serum fraction.

There are, however, other non-coagulating agents capable of accelerating separation whose action does not depend upon the hydrogen ion concentration. So far as I know, the mode of action of these bodies is not understood.

The best separation accelerating agent of this type, which I have found, is a clarified carragheen or Irish moss sol. Among the advantages of carragheen sols may be mentioned the fact that, under like centrifugal treatment, higher concentrations are obtainable from an alkaline latex, in the absence of other protective, than can be procured from latex below pH 7.0 through the agency of bodies requiring, to avoid the formation of coagula, the presence of protective colloids and precise hydrogen ion concentration control. The carragheen-accelerated concentrate is also more mobile at the same concentration and is less sensitive to coagulating agents, and particularly to mechanical impact. It is more readily handled. There is also an important advantage in that concentration of ammoniacal latex may be accelerated by this agent in the absence of any added protective colloid. The importance of this advantage may be seen in the fact that, in a 75 per cent concentrate derived from a 33 per cent latex, there remains but about 16.5 per cent of the protective colloid originally added to the latex, and that therefore five times the amount of the retained protective colloid is lost in the serum withdrawn from the machine. While a carragheen sol has a pH of about 5.6, no protective colloid is needed during concentration and it is effective when added to even strongly ammoniacal latex. Latex to which some 0.2 to 0.5 per cent carragheen, as a sol, has been added shows considerably accelerated separation in the centrifuge. In fact, a separation, yielding a substantially clear serum, may be obtained in a relatively short time at a centrifugal force which, acting on untreated ammoniacal latex, would not cause the separation of the smaller particles at all; which would give a serum containing substantial amounts of rubber.

As little as 0.1 per cent carragheen present in the latex in dissolved condition will appreciably accelerate separation in the centrifugal, while half this amount, i. e. 0.05 per cent, has but a negligible effect. The maximum permissible amount of carragheen in a concentrate, capable of stable redispersion, is such as to be of the order of 0.05 per cent when diluted to normal consistency. On the other hand, the optimum concentration of carragheen in latex, for maximum acceleration of concentration, is about 0.5 per cent, which would leave, in concentrates containing between 65 and 75 per cent rubber, two to three times the permissible maximum for stable redispersion. While moss sols containing as much as 3.5 per cent carragheen may be added to latex, they are so viscous that mixing is difficult. For ready mixing, a 1.0 per cent moss sol is about the optimum, and, while addition of this strength sol to latex in amount sufficient to yield 0.5 per cent moss on the total fluid involves dilution of the latex and a consequent increase in the amount of moss used, the facility of thorough mixing more than offsets the cost of the extra moss. Poor mixing results in loss of rubber to the serum fraction and further tends to form a layer of thick gel-like moss sol, containing some entrapped rubber, between the light concentrate and the heavy serum. Thorough mixing is somewhat facilitated by previous treatment of the sol in a so-called colloid mill. When the intermediate gel-like layer does occur, it is discharged with the heavy serum fraction and its contained latex particles may be recovered by repassing the serum through the machine.

The following examples are illustrative of the moss-latex relation as it is modified by concentration. In making an unwashed concentrate containing carragheen and 65 per cent rubber, latex containing 38 per cent rubber is diluted with 1.1 per cent moss sol to yield about 0.5 per cent moss on total liquid.

100 parts of latex and 50 parts moss sol contain 38 parts of rubber
    62 parts of water in latex
    49.45 parts of water in moss sol
    0.55 parts of moss Concentration of moss in total liquid of diluted latex=

$$\frac{0.55}{62.0+49.45} \times 100 = 0.493 \text{ per cent}$$

The resulting 65 per cent concentrate consists of 38 parts of rubber
    20.5 parts of fluid containing 0.493 per cent moss=
    20.5 × 0.00493 = 0.111 parts of moss If the 65 per cent concentrate is now dispersed in water to the original consistency, the relationship becomes:—

38 parts of rubber
    41.5 parts of added water
    20.5 parts of residual fluid containing 0.111 parts of moss Concentration of moss in total liquid of redispersed latex=

$$\frac{0.111}{41.5+20.5} \times 100 = 0.18 \text{ per cent}$$

If the concentration is carried to 75 per cent rubber content, which approximates the commercially feasible limit of effluent concentration, the relations become:—

38 parts of rubber
    12.7 parts of fluid containing 0.493 per cent moss=
    12.7 × 0.00493 = 0.0626 parts moss If the 75 per cent concentrate is now dispersed in water to the original consistency, the relationship becomes:—

38 parts of rubber
    49.3 parts of added water
    12.7 parts of residual fluid containing 0.0626 parts of moss Concentration of moss in total liquid of redispersed latex=

$$\frac{0.0626}{49.3+12.7} \times 100 = 0.11 \text{ per cent}$$

At the optimum moss concentration, an unwashed concentrate containing 65 per cent rubber will, when diluted to normal latex consistency, contain 0.18 per cent moss or over three times the permissible maximum; similarly a 75 per cent concentrate, when diluted, will contain 0.11 per cent or twice the ordinarily permissible amount. For some purposes of latex the presence of a separation accelerating agent is not detrimental; but frequently its presence is highly objectionable because of the acceleration of the secondary separation referred to ante. For most purposes it is desirable that the latex particles remain in uniform stable dispersion when the concentrated latex coming from the centrifugal is diluted to about the consistency of normal latex. The washing step of my prior process is effective in displacing the residual moss-containing fluid to reduce the moss content to a value below the maximum permissible for stable redispersion. In treating ammoniacal latex, freed of cream and containing 0.5 per cent carragheen, in the centrifugal according to my prior invention, the light layer of thick concentrated latex is, before washing, somewhat different physically from that obtained with latex not having this addition. It is to some degree consistent; but there is no merging of particles or coagulation. On washing the separated light layer with ammoniacal water, and particularly if a little hemoglobin be also present, the consistency changes to that normal to a concentrated cream-free latex.

It is the essence of the present invention to produce, in a continuous quickly operating process, a stable highly concentrated latex containing no coagula or particles of rubber of a substantially greater order of magnitude than the largest normal latex globules. As stated, this is in part accomplished by first treating alkaline latex to remove such coagula as it may contain, then adding a concentration accelerating agent and then subjecting the so-treated latex to intense centrifugal force in a suitable continuous centrifugal machine to produce serum and a latex concentrate. In the presence of a small amount of carragheen sol, a high degree of concentration may be obtained with little or no added protective colloid; but the concentrate is sensitive to mechanical agitation, coagula being produced by mechanical impact, friction, etc. There is advantage in protecting the concentrate against coagulation by the addition thereto of suitable protective colloids.

It is further an object of the present invention to stabilize the highly concentrated latex, while still within the centrifuge and under the influence of intense centrifugal force, by the addition thereto of a preferably alkaline solution of a protective colloid without substantial reduction of the concentration of the latex. The so stabilized concentrate may then be received, as an effluent, in the usual type of receiving device, without fear of coagulation of the concentrate by mechanical impact.

There is a three-fold advantage in adding the protective colloid to the concentrate within the centrifuge; the effluent concentrate is protected against coagulation by mechanical impact and is more readily caught without coagulation; there is substantially no such dilution of the concentrate as would, of necessity, be the case were the protective colloid solution worked into the concentrate after leaving the centrifuge; and finally there is no loss of protective, as would unavoidably occur were it admixed with the latex before concentration. The difficulty of thorough admixture of a relatively thin soap or proteid solution with a thick cream-like concentrate is great and fairly obvious. I have found that, when a suitable protective colloid, such as hemoglobin, ammonium stearate or saponin, is added to the ammoniacal wash solution of my prior process and admitted to the concentrate within the centrifugal, the protective colloid solution is effective in displacing the residual serum fluid, that the rate of admission to the concentrate can be so adjusted that the serum fluid is displaced without substantial dilution of the concentrate and that there is a substantial lowering of the viscosity of the concentrate.

As stated, the carragheen sol, or other accelerating agent, is conveniently added to the latex when washing the cream in the first treatment to remove the latter. I have found that, when so added, the accelerating agent, and particularly with the rather viscous moss sol, is effectively and thoroughly mixed into the latex, and that excessive dilution of the latex is avoided as well as the necessity of using moss sols so highly concentrated as would be required if the latex had previously been diluted by wash water. Highly concentrated moss sols are very viscous and their addition to latex offers considerable difficulty, as stated.

I have further found that it is desirable to free the carragheen sol from solid matter by centrifugal clarification prior to using, as any minute particles of unsolvated moss going into the machine tend to entrain latex particles with a consequent loss of rubber to the heavy serum fraction. With a moss sol which has been merely filtered, the rubber content of the separated serum may be as high as 0.5 per cent; while, if the sol has been clarified and is thoroughly admixed, serum containing less than 0.1 per cent rubber may be obtained.

The carragheen sol is preferably made alkaline, by the addition of a trace of ammonia, in order to avoid local action between the slightly acid sol and the latex particles, particularly when added to fresh latex or a latex to which has been added but a small amount of ammonia.

There are other colloid bodies analogous to carragheen, such as pectin, gum arabic, gum tragacanth, etc., which may be used, but they are not as effective as Irish moss and are considerably more expensive. The extractive "carragheenin" is effective but relatively costly.

A machine suitable for conducting the operations of the described process is shown in the accompanying drawing, wherein;

Fig. 1 is a vertical cross-sectional view of a centrifugal machine, and;

Figs. 2, 3, 4, and 5 are transverse cross-sectional views taken along the lines 2—2, 3—3, 4—4, and 5—5, respectively.

The machine comprises a main casing 10 provided with a base 11, in which the moving parts are mounted. At the upper portion 12 of the casing 10 there is formed a housing 13, adapted to receive a turbine wheel 14 for driving the rotor. The wheel 14 is mounted in ball bearings 15 and is provided with a hollow shaft 16 extending within the casing 10. Positioned outside of the housing 13 is a hollow rod 17 which extends within, but does not contact with, the aperture in the hollow shaft 16. The purpose of this member is to admit fluid to the interior of the machine.

The hollow shaft 16 extends downwardly through a pair of casings 18 and 19, which receive the effluent liquid, and which are separated from each other by a wall 21 and from the main portion of the bowl of the machine by a partition 22. Adjacent the partition 22, the shaft 16 is secured to an annular member 23 provided with an aperture 24 extending therethrough and admitting fluid from the rotor to the casing 19, in a manner presently to be described. The member 23 is also formed with a second aperture 25 extending into the discharge casing 18. Positioned below the aperture 24, but communicating with the aperture in the shaft 16 and the aperture 25, is an annular member 26 disposed concentrically with respect to the axis of the machine, and terminating in a thin edge 27 within the rotor. This annular member functions as a dam, preventing the admixture of the effluents moving to the casings 18 and 19 through the apertures 25 and 24.

Secured to the outer portion of the annular member 26 is a bowl 30 adapted to be rotated and to contain the latex undergoing treatment. The bowl is defined by a cylindrical tube 31 extending downwardly to the lower portion of the casing 10, and it is divided, for the major portion of its length, into four sectors or quadrants, 32, 33, 34, and 35, by radially disposed walls or vanes 36, 37, 38, and 39. The upper extremities of the dividing walls lie adjacent the annular member 26, and may be defined by substantially straight edges. The lower boundaries of the walls, however, are curved, as indicated at 41 and 42, along arcs so struck as to bring the entering latex to full velocity, during rotation, without the development of eddy currents which would tend to induce coagulation. Along the axis of the bowl, and projecting from nearly the bottom thereof to a point above the center, is a tapered hollow tube 43 through which is admitted a solution of protective colloid. An annular sleeve 44 is positioned concentrically of the tube 43 adjacent its upper extremity, for the purpose of receiving the washing solution emerging from the upper end of the tube 43 and transmitting it to the contents of the bowl without the generation of violent impacts.

At the bottom of the cylindrical sleeve 31 is a cap member 50, forming a closure for the sleeve, and provided with an axially disposed aperture 51, in which are concentrically positioned a pair of spaced pipes 52 and 53. Both pipes project below the lower portion of the casing 10, and are there connected to laterally disposed pipes 54 and 55, through which latex and washing liquid are admitted to the rotor 30. The inner pipe 52 is connected to the casing by means of a conventional fitting 56, which also serves to prevent leakage from the bowl around the inner pipe 53. The pipe 53 terminates in a nozzle 57 which is positioned just below the tube 43, and which discharges its contents into the tube. The cap 50 terminates in an annular sleeve 58 which is adapted to receive a bearing positioned in a casing 59, secured to a block 60 sealing the bottom of the casing 10. This bearing is of the oscillatory type customarily used in suspended bowl centrifugal constructions, and hence needs no further description.

In the operation of the machine for the purpose of preparing a standardized, purified, and permanently redispersible artificial latex, a quantity of ordinary latex preserved with ammonia is introduced to the rotor 30 through the pipe 54. The speed of the machine is such as to throw out only the coagula, or particles greater than 4 or 5 mu in diameter. As the so-purified latex emerges from the machine through the pipe 24, a quantity of moss solution may be added through the pipe 55, the tube 43 and the baffle 44 and aperture in the hollow shaft 16. This method of mixing is desirable, as the centrifgual action to which the moss solution is subjected assists in making a well mixed effluent. The separated cream may be flushed out through the aperture 25 into the chamber 18 by introducing a stream of water containing a protective such as hemoglobin through the pipe 17. It will be understood, of course, that the specific form of machine herein described need not be employed for effecting this preliminary separation, although it may be so used as just described.

The effluent latex, which is now free from coagula and which has received an accelerating agent, such as the moss solution, is then ready for a second passage through the machine, which is now operated at a sufficiently high speed to cause a separation of the normal rubber globules from the serum. This centrifuging operation is conducted in substantially the same manner as the operations which I have previously proposed in my acknowledged application and patents. The latex is introduced through the pipe 54, being brought gradually to full speed without violent action through the medium of the curved vanes 36, 37, 38, and 39. At the same time, a stream of water containing ammonia and hemoglobin is introduced through the pipe 55, the tube 43, and the distributing baffle 44, which permits of the mingling of the two streams without tendency for coagulation. The rubber forms a layer adjacent the inner portion of the bowl, while the wash solution forms a second layer adjacent the periphery of the rotor. As the wash solution passes through the inner layer, it carries with it the natural serum of the latex, and the non-rubber constituents, and also removes the major portion of the accelerating agent or moss. This washing liquor is then discharged through the duct 24 into the chamber 19. The concentrate passes through the duct 25 into the chamber 18, being gradually reduced in velocity to prevent coagulation.

If desired, a final washing may be effected by means of a stream introduced through the tube 17. This stream passes under the baffle or dam 26, but rubber globules are not carried with it, their loss being prevented by the depending member 26. The rubber containing effluent discharged into the casing 18 represents a dispersion of individual rubber globules in an artificial serum, and free from non-rubber constituents. It may be diluted with ammoniacal water to form a rubber dispersion freely entering capillaries, and in other respects exhibiting properties of a cream free natural latex.

In a typical embodiment of the present invention utilizing the apparatus illustrated, ordinary commercial ammonia-preserved latex carrying about 38 per cent rubber was passed through the machine rapidly, so as merely to separate the creamy coagula particles. This coarse material represented 5 per cent of the rubber in the latex treated. The latex then received an addition of sufficient carragheen moss sol to give about 0.5 per cent on the sol diluted latex. This moss sol was made by swelling one part of dry selected moss in about 80 times its weight of hot water, centrifugally clarifying the resulting sol and diluting with slightly ammoniacal water to give a final sol containing 1.1 per cent moss. The moss sol was slightly acid, as stated, and the addition of a trace of ammonia was desirable, particularly as the sol was to be added to fresh unprotected latex. One part of this 1.1 per cent sol was added to two parts of ammoniacal latex and the so-diluted latex, being now conditioned for accelerated separation, was repassed through the centrifugal at a rate and under conditions appropriate to yield moderately concentrated latex. The concentrate was washed in the centrifugal with an ammoniacal solution of hemoglobin to displace the residual serum together with the moss contained therein and to add an effective protective colloid before discharging the concentrate. The thick fluid concentrate discharged from the machine had the consistency of a mobile heavy cream and contained 60 to 65 per cent rubber, while the serum effluent contained 4.9 per cent solids including approximately 0.1 per cent rubber, or approximately 0.25 per cent of total rubber.

The present invention should not be considered as being limited to the treatment of any particular latex. While most commercial latext is at the present ammonia-preserved natural latex, I consider the treatment, according to the present invention, of any aqueous suspension of rubber, artificial or natural, however preserved and however previously treated, to be within the scope of the invention, except as it may be limited by the claims.

Latex is sometimes concentrated by evaporation in the presence of relatively large amounts of protective colloids, such as soaps, which, in the amounts required to prevent extensive coagulation, are seriously detrimental to the quality of the rubber when they are permitted to remain in the latex. As any latex concentrate approaches a solid in consistency, it becomes progressively more sensitive to coagulating agencies, particularly the mechanical impact of the stirring devices required in apparatus suitable for concentration by evaporation, and correspondingly greater quantities of protective colloid is required to prevent extensive coagulation. Because of the high cost of transporting latex, there is advantage in reducing the water content before shipment, but the large amount of coarse rubber particles usually present in the highly concentrated latices of the prior art, as well as the high proportions of protective colloid necessarily added, seriously limit the advantage of making and using such latices. It is within the scope of the present invention so treat these commercial preserved concentrated latices to remove the coarse material and such non-rubber solubles, natural or added, as may be present, and to obtain a stable latex concentrate capable of being dispersed in water and being substantially free both of rubber particles of a larger order of magnitude than 5 mu and of the natural non-ruber solubles of latex. In other words, by the use of the present invention these particular materials can be reconverted into a high grade artificial latex of normal properties.

What I claim is:—

1. In a process for purifying and concentrating latex, the step which comprises effecting a preliminary separation from the latex of all suspended flocculæ greater than 5 mu in diameter while retaining in suspension the normal suspensoids of the latex.

2. In a process for purifying and concentrating latex, the step which comprises effecting a preliminary separation from the latex of all suspended flocculæ greater than 5 mu in diameter by means of centrifugal force while retaining in suspension the normal suspensoids of the latex.

3. In the purification and concentration of latex, the process which comprises effecting a preliminary separation from the latex of all suspended matter greater than 5 mu in diameter while retaining suspended particles of less diameter by subjecting the latex to a gradually increasing centrifugal force and withdrawing said latex from the influence of said force when the coarser suspended matter is removed without mechanical agitation of the latex.

4. A method of preparing concentrated and purified permanent dispersions of isolated rubber latex particles, which comprises removing from commercial latex all suspended matter greater than 5 mu in diameter, adding to the latex an agent effective to accelerate the separation tendencies of the particles without increasing coagulation tendencies, subjecting the so-treated latex to a gradually increasing centrifugal force, displacing the natural serum of the latex by means of a solution containing a protective colloid, and removing the concentrate from the influence of the centrifugal force under conditions precluding violent agitation of the effluent.

5. A method of preparing concentrated, purified, and permanent dispersions of latex rubber particles in an artificial serum which comprises removing from latex the natural cream thereof, adding to the latex a solution containing carragheen moss, subjecting the latex to the influence of centrifugal force under conditions precluding the coagulation of the latex, washing the natural serum of the latex away from the rubber content thereof by means of a solution of protective colloid during such centrifugal treatment, and removing the concentrate in the added solution under conditions precluding violent agitation thereof.

6. A dispersion of latex rubber comprising an aqueous phase containing ammonia and a protective colloid and single particles of rubber derived from latex, said dispersion being free from cream or irreversible aggregates, being freely filterable through porous material, stable and permanent upon prolonged standing, and substanially free from non-rubber constituents of normal latex.

7. In the purification of latex the process which comprises exposing commercial latex to centrifugal action under avoidance of violent agitation, the time of exposure and the degree of exposure being such as to produce merely a separation of floccula over 5 mu in diameter.

8. A method of purifying and concentrating latex which comprises subjecting commercial latex to the influence of centrifugal force just sufficient to separate the said latex into a cream of coagula particles greater than 5 mu in diameter and a coagulum-free latex containing suspended particles of 5 mu or less diameter, withdrawing the coagulum-free latex from the influence of said centrifugal force and then subjecting the coagulum-free latex to the influence of centrifugal force of greater intensity to separate said coagulum-free latex into two portions, one a substantially rubber free serum and the other a concentrated latex.

9. A method of purifying and concentrating latex which comprises subjecting latex to the influence of centrifugal force just sufficient to separate the latex into a cream of coagula particles greater than 5 mu in diameter and a coagulum-free latex containing suspended particles of 5 mu or less diameter, withdrawing the coagulum-free latex from the influence of said centrifugal force and adding a separation-accelerating agent to said coagulum-free latex.

10. In the purification and concentration of latex the process which comprises adding to a coagulum-free latex a separation-accelerating agent and subjecting the so-treated latex to the influence of centrifugal force to separate said coagulum-free latex into two portions, one a substantially rubber free serum and the other a concentrated latex, and separately withdrawing the said separated portions from the influence of the centrifugal force.

11. In the purification and concentration of latex, the process which comprises diluting a coagulum-free latex with a solution of carragheen moss and subjecting the diluted latex to the influence of centrifugal force to separate the latex into two portions, one a substantially rubber free serum and the other a concentrated latex.

12. A method of preparing concentrated, purified, stabilized, coagulum-free latex, which comprises separating from commercial ammoniacal latex suspended rubber coagula particles greater than 5 mu in diameter while retaining in suspension particles of less diameter, adding to the latex so obtained a separation-accelerating agent, subjecting the so-treated coagulum-free latex to the influence of centrifugal force to separate the said latex into two portions, one a substantially rubber free serum and the other a concentrated latex and adding to the concentrated latex a solution containing a protective colloid to displace the residual separation-accelerating agent and the natural serum of said concentrated latex.

13. In the purification and concentration of latex the process which comprises separating commercial ammoniacal latex into a cream of coagula particles and a coagulum-free latex, diluting the coagulum-free latex with a solution containing carragheen moss, subjecting the so-treated coagulum-free latex to the influence of centrifugal force to form a substantially rubber free serum and a concentrated latex, adding to the concentrated latex a solution containing a protective colloid to displace the residual carragheen moss solution and the natural serum.

14. A method of purifying and concentrating latex which comprises subjecting the latex to the influence of a centrifugal force just sufficient to separate the latex into a cream of coagula particles greater than 5 mu in diameter or less diameter, withdrawing the coagulum-free latex from the influence of said centrifugal force and simultaneously adding a separation-accelerating agent to said coagulum-free latex, subjecting the so-treated coagulum-free latex to the influence of another centrifugal force of such intensity to separate the so-treated coagulum-free latex into a rubber-free serum and a concentrated latex, washing said concentrated latex while maintained under the influence of said second centrifugal force with a solution of a protective colloid, sufficient of said solution being used to displace all the natural serum and to nullify the effect of the residual separation-accelerating agent of the concentrated latex, and then withdrawing the so obtained artificial latex from the influence of centrifugal force without violent mechanical agitation.

In testimony whereof, I have hereunto affixed my signature.

WILLIAM B. WESCOTT.